United States Patent Office 3,026,172
Patented Mar. 20, 1962

3,026,172
PROCESS FOR SEPARATING CARBON MONOXIDE AND OLEFINS FROM GASEOUS MIXTURES
Josef Hirschbeck, Burgkirchen, Upper Bavaria, and Heinz Steinrötter, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 24, 1958, Ser. No. 750,562
Claims priority, application Germany July 26, 1957
4 Claims. (Cl. 23—2)

The present invention relates to a process for separating carbon monoxide and olefins from gaseous mixtures.

A number of processes for the separation of gaseous mixtures obtained by the thermal splitting of liquid or gaseous hydrocarbons have already been proposed. The separation may be effected by distillation at a low temperature or by treating the gaseous mixture with solid or liquid absorbing media, such as active coal or wash oil, or by selectively absorbing the olefins in cuprous salt solutions. These processes have a number of advantages and disadvantages which depend upon the composition of the gaseous mixtures and upon the purity of the products desired. The separation by distillation of gases obtained by thermal splitting has the drawback that, when carrying out the distillation in the distilling plant, the dimensions of the exchanging surfaces of the cold or heat exchangers disposed in the distilling plant are very limited in order to render the process as economical as possible. The distilling plant is thereby rendered sensitive to variations of composition and quantity of the gases to be separated. Such variations occur especially when the gases to be treated, for example gases obtained by thermal splitting, consist of a great number of components each of which has a different specific heat.

Great difficulties are also encountered when the gaseous mixtures to be separated contain carbon monoxide which is to be separated from the valuable paraffins and olefins or which, for the purpose of subsequent treatment, is to be obtained in high concentration.

This is the case in the manufacture of olefins by the thermal splitting of hydrocarbons in which process the residual gases obtained which are free from olefins are to be returned to the pyrolysis plant while free from monoxide. If the gaseous mixtures obtained during the splitting operation are, for example, to be separated by distillation the separation of the carbon monoxide which as a rule is contained in the gaseous mixture to be treated in a concentration of up to 15 percent by volume has to be carried out at a very low temperature which can practically only be obtained by the evaporation of liquid nitrogen and which consequently leads to considerable technical expenditure and high operating expenses. The realization of the aforesaid method is moreover complicated when the low boiling portions contained in the gaseous mixtures, such as hydrogen, nitrogen, carbon monoxide, methane, ethylene and ethane, are present, as has been mentioned above, in varying concentrations.

Now, we have found that the aforesaid difficulties can be overcome in a reliable and economically advantageous manner by absorbing in a first stage the olefins and the carbon monoxide together from gaseous mixtures by treating them with cuprous salt solutions such as will be described below and by essentially separating them in this way from other substances such as nitrogen, methane and ethane. The mixture of olefins and carbons monoxide which has thus been obtained is then further separated by subjecting it to a second stage distillation. The process is particularly suitable for the separation of gaseous mixtures obtained by the thermal splitting of hydrocarbons, which mixtures have been freed by known methods from sulfur compounds, hydrocarbon compounds containing triple carbon bonds and hydrocarbons liquid under normal conditions. The process of the invention requires a considerably lower expenditure than the separation of the total quantity of the split gases by way of distillation. When operating according to the invention, the olefins obtained are of a high degree of purity and free from saturated hydrocarbons containing the same number of carbon atoms. The carbon monoxide is obtained alone in a high concentration and a residual gas is obtained which is free from carbon monoxide and suitable to be reconducted to the pyrolysis plant or to be used in catalytic processes.

In the first stage of the process of the invention, a cuprous salt solution is used in which bivalent copper compounds constitute 5 to 20 and more especially 10 to 15 percent of the total amount of copper contained in the solution. Suitable salts are the cupric salts corresponding to the cuprous salts that are already intended to be present in the solution, other cupric salts may, however, also be added. The copper solution is advantageously prepared in known manner and the necessary amount of cuprous salt is converted by way of oxidation into the cupric salt. The solutions of cuprous salt and cupric salt may have an acid, neutral or alkaline reaction. There may accordingly be used solutions acidified by hydrochloric acid, or ammoniacal solutions or solutions containing organic nitrogen-containing bases, more particularly amines or hydroxy-alkyl-amines. Alkaline solutions are preferred since they enable the degree of corrosion to be kept as low as possible. Moreover, the regeneration of alkaline solution—which is described below— proceeds somewhat more easily than that of acid solutions. Accordingly, it is more economical to use alkaline solutions instead of acid solutions. Such alkaline solutions may be prepared, for example, by heating a mixture of cuprous oxide, ammonium nitrate, monoethanolamine, and water, while stirring, and by expelling the ammonia that is set free. The starting components are, for example, applied in such a proportion that a solution is obtained which contains per liter about 200 grams of copper in the form of a monoethanolamine complex of copper nitrate and which furthermore, besides free monoethanolamine, contains the excess amount of monoethanolamine nitrate necessary for the formation of the cupric salt. Alternatively, the copper solution may be prepared by bringing together cuprous oxide, monoethanolamine and diluted nitric acid. It is, however, also possible to use metallic copper as starting material and to dissolve it, for example, in an aqueous solution of ammonium salts and an excess of ammonia by treatment with air or oxygen. Those skilled in the art will have no difficulty in finding further ways of preparing suitable solutions.

Oxygen or oxygen-containing gases such as air are introduced into these solutions, preferably at an elevated temperature, until 5 to 20 percent of the monovalent copper is oxidized.

This oxidation can also be brought about by other oxidizing agents, it is, however, convenient and cheap to effect it by introducing oxygen or oxygen-containing gases such as air, for example under elevated pressures of up to 50 atmospheres (gauge) or, preferably, under atmospheric pressure, into the copper salt solution. This process can be considerably accelerated and the oxidizing agent better used by operating at a temperature which is nearly equal to the temperature at which the desorption of the gases to be separated takes place, viz. at a temperature within the range of about 30 to 70° C. In some cases, the temperature applied may be below or above the said range.

A suitable way of carrying out the oxidation process is to introduce oxygen or air into the degassed copper salt solution, which is then cooled and reconducted to the washing stage. By operating in this manner and at the same time continuously controlling by analysis the content of bivalent copper in the solution, the desired uniform composition of the circulating copper solution can be attained, if necessary with variation of the quantity of oxidizing agent added. The adjustment of the proportion of bivalent copper and monovalent copper can, of course, also be effected at any other place of the apparatus, for example by admixing the oxidizing agent to the gaseous mixture to be treated.

In the process, the use of cuprous nitrate-amino-ethanol solutions is of special advantage, it is, however, also possible to use other copper solutions that have proved useful in the industry, for example those in which carbonate, chloride, acetate or formate are present as anions. Another advantage of the process is that it is substantially independent of the concentration of olefins or carbon monoxide and consequently applicable to gaseous mixtures of different kind, composition and origin; furthermore the efficiency of the solutions remains constant for a long time. The adjustment of the content of bivalent copper and monovalent copper by a continuous addition of oxygen or air as described above enables the degassing of the loaded cuprous salt solution to be carried out at an elevated temperature and the expensive degassing in vacuo, that requires complicated apparatus, to be completely or largely dispensed with or to be carried out under only moderately reduced pressure.

The gaseous mixtures can be treated with the copper salt solutions according to the invention under any desired pressure, for example under a pressure of between 1 and 50 atmospheres (gauge) and preferably 10 and 30 atmospheres (gauge). In the treatment of the usual gaseous mixtures containing olefins, the application of higher pressures does not offer any advantage, unless the olefins are contained in a low percentage only in the gaseous mixture to be treated. As compared with the application of normal pressure, the application of an elevated pressure has the advantage that in spite of the use of pressure-resistant apparatus the expenditure is considerably lower since smaller apparatus are required and the absorption velocity is largely increased. The absorption of the olefins and the carbon monoxide is suitably carried out at a temperature within the range of about 0 to about 30° C. and preferably about 0 to about 20° C. The desorption is advantageously effected at a temperature that is higher or under a pressure that is lower than the absorption temperature or pressure, the application of a higher temperature and a lower pressure being particularly advantageous. There are applied, for example, pressures of between 0.1 and 2 atmospheres and temperatures within the range of about 30 to about 70, preferably about 40 to about 60° C.

In a total separation by distillation of the gaseous mixture to be treated, the use of a great number of individual apparatuses and several low-temperature cycles would be necessary. When carrying out the process of the invention the distillation apparatus can considerably be simplified. Since the inert constituents of the gaseous mixture or the inert constituents and the saturated hydrocarbons have already been eliminated in the first stage of the process by means of the aforesaid cuprous salt solution the great variations which sometimes occur during the pyrolysis of hydrocarbons with regard to the concentration of the gaseous constituents are much less noticeable in the distillation apparatus necessary in the second stage of the process. The method of the invention can consequently be applied without the use of supplementary devices for the separation of products obtained by different cracking processes which yield gases of different composition. In all cases, the same final products having the same concentration and the same degree of purity are obtained.

It has already been proposed to separate olefins from gaseous mixtures containing hydrocarbons by means of cuprous salt solutions and to continue the separation by distillation. The known processes, however, relate to the treatment of gaseous mixtures free from carbon monoxide. With respect to the separation of olefins from gaseous mixtures containing carbon monoxide, it seemed, however, that it would be more suitable to separate the gases by a pure distillation process or by other methods of separation, for example a washing with oil, since, owing to the great affinity of carbon monoxide for cuprous compounds, olefins and carbon monoxide can only be separated together and the advantages of a selective separation of olefins from hydrocarbon mixtures by a washing with cuprous salt solutions would be lost. Moreover, because of the reducing action of carbon monoxide on cuprous salt solutions it was not to be foreseen that olefins and carbon monoxide could be separated together in an economical and safe manner as long as the cuprous salt solution required for these cases was not known.

Apart from the technical advantages that have already been mentioned the method of the invention wherein the separation is carried out in two stages, viz. a washing with a cuprous salt solution and the further separation by distillation, offers unexpected economic advantages for the separation of gaseous mixtures containing hydrocarbons, which could not be deduced from the prior art.

The separation by distillation may be carried out, for example, under a pressure of between 18 and 30 atmospheres (gauge) and at a temperature of the fractionating column of $-25$ to $-45°C$. First, a fraction of ethylene and carbon monoxide and a fraction of propylene and butylene are obtained. The first-mentioned fraction can then be expanded until it is under a pressure of, for example, 0 to 1 atmosphere (gauge) and subsequently separated to yield ethylene and carbon monoxide, the separation being effected at a low temperature which may be adjusted, for example, by a low-temperature cycle of methane. In addition, it is possible to separate the propylene and the butylenes by distillation from the fraction of propylene and butylene.

The following example serves to illustrate the invention but it is not intended to limit it thereto.

*Example*

1860 cubic meters (measured at N.T.P.) of a gas obtained by the thermal splitting of a hydrocarbon oil and freed from carbon dioxide, sulfur compounds, acetylene-hydrocarbons and the hydrocarbons liquid under normal conditions, and having the following composition:

| | Percent by volume |
|---|---|
| $H_2+N_2$ | 30.0 |
| CO | 12.4 |
| $CH_4$ | 12.6 |
| $C_2H_4$ | 33.6 |
| $C_3H_6$ | 4.8 |
| $C_4H_8$ | 3.0 |
| Homologs of methane | 3.6 | were treated in known manner in a trickling tower under a pressure of 25 atmospheres (gauge) with 45 cubic meters per hour of a solution of cuprous nitrate and ethanolamine containing 200 grams per liter of monovalent copper and 30 grams per liter of bivalent copper. 860 cubic meters (at N.T.P.) per hour of a gaseous mixture containing 64.2% by volume of $H_2+N_2$
26.5% by volume of $CH_4$
9.3% by volume of gaseous hydrocarbons containing two or more carbon atoms escaped from the trickling tower and were returned to the splitting apparatus as gas for heating.

1000 cubic meters (at N.T.P.) per hour of a mixture of olefins and carbon monoxide having the following composition:

| | Percent by volume |
|---|---|
| CO | 22.7 |
| $C_2H_4$ | 61.0 |
| $C_3H_6$ | 8.4 |
| $C_4H_8$ | 5.0 |
| $H_2$, $CH_4$ and homologs | 2.9 | were desorbed from the copper salt solution by expansion of pressure and heating.

The olefin concentrate thus obtained was again compressed until it was under a pressure of 23 atmospheres (gauge) and it was then separated in a distillation apparatus into a fraction of $C_3$ and $C_4$ and a fraction containing the gaseous constituents of lower specific weight, the temperature of the column being within the range of —30 to —35° C. After the gaseous mixture thus obtained, which essentially consisted of ethylene and carbon monoxide, had been expanded until it was under a pressure of about 0.5 atmosphere (gauge), it was further separated in a cold atmosphere produced by a low temperature cycle of methane at a temperature within the range of —140 to —145° C. 615 cubic meters (at N.T.P.) per hour of an ethylene gas free from carbon monoxide and containing more than 99% by volume of ethylene and about 250 cubic meters (at N.T.P.) per hour of a residual gas containing more than 90% by volume of carbon monoxide and which could be applied for a separate purpose were obtained. The fraction of $C_3$ and $C_4$ which had first been obtained was separated in a further separating column under a pressure of 20 atmospheres (gauge) to yield 160 kg. per hour of propylene containing more than 99% of propylene and 140 kg. per hour of a butylene mixture.

A gaseous mixture of a different composition, for example a mixture containing 23% of hydrogen, 3% of nitrogen, 3% of carbon monoxide, 18% of methane, 37% of ethylene, 9% of propylene and 7% of ethane and propane can be separated under the same operating conditions and in the same separation apparatuses as those described above, the final products obtained having the same degree of purity.

We claim:
1. A process for the separation of carbon monoxide and mono-olefins from gaseous mixtures containing them, and then from each other, which comprises treating said gas mixtures at a temperature in the range from about 0° C. to about 30° C. and under a pressure between 1–50 atmospheres gauge pressure with an aqueous solution containing as essential ingredients monovalent and bivalent copper, degassing at a pressure of 0.1 to 2 atmospheres the gases dissolved in said solution, partially reoxidizing the solution so that 5 to 20 percent of the copper is present as bivalent copper and 95 to 80 percent as monovalent copper, and separating the mono-olefins and the carbon monoxide from each other by distillation, said degassing and partial reoxidization being carried out at a temperature in the range from about 30° C. to about 70° C.

2. A process for the separation of carbon monoxide and mono-olefins from gas mixtures and then from each other, which comprises treating said gas mixtures with an aqueous solution at a temperature in the range from about 0 to about 30° C. and under a pressure in the range from 1 to 50 atmospheres (gauge pressure), said solution containing as essential ingredients monovalent and bivalent copper, degassing the gases dissolved in said solution at a temperature in the range from about 30 to about 70° C. and under a pressure in the range from 0.1 to 2 atmospheres, partially reoxidizing the solution by means of a compound selected from the group consisting of oxygen and gases containing free oxygen, so that 5 to 20 percent of the copper is present during the whole reaction as bivalent copper and 95 to 80 percent as monovalent copper, and separating the mono-olefins and the carbon monoxide from each other by distillation.

3. A process for the separation of carbon monoxide and mono-olefins from gas mixtures and then from each other, which comprises treating said gas mixtures at a temperature in the range from 0 to 30° C. and under a pressure in the range of 1–50 atmospheres gauge pressure with a solution containing as essential ingredients monovalent and bivalent copper, degassing the gases dissolved in said solution at a temperature in the range of 30 to about 70° C. and at a pressure of from 0.1 to 2 atmospheres, partially reoxidizing the solution, so that 5 to 20 percent of the copper is present during the whole reaction as bivalent copper and 95 to 80 percent as monovalent copper, and separating the mono-olefins and the carbon monoxide from each other by distillation.

4. A process for the separation of carbon monoxide and mono-olefins from gas mixtures and then from each other, which comprises treating said gas mixtures at a temperature in the range from 0 to 20° C. and under a pressure between 10–30 atmospheres gauge pressure, with a solution containing as essential ingredients monovalent and bivalent copper, degassing the gases dissolved in said solution at a temperature in the range from 40–60° C. and under a pressure of from 0.1 to 2 atmospheres, partially reoxidizing the solution, so that 10 to 15 percent of the copper is present during the whole reaction as bivalent copper and 90 to 85 percent as monovalent copper, and separating the mono-olefins and the carbon monoxide from each other by distillation.

References Cited in the file of this patent

UNITED STATES PATENTS

| 1,999,159 | Peski | Apr. 23, 1935 |
| 2,005,500 | Joshua et al. | Jan. 18, 1935 |
| 2,043,263 | Porter | June 9, 1936 |

FOREIGN PATENTS

| 304,345 | Great Britain | Jan. 17, 1929 |